Aug. 25, 1936.  W. J. BLESSING  2,052,162
CRITICAL SPEED CONTROL APPARATUS
Filed April 7, 1934  4 Sheets-Sheet 1
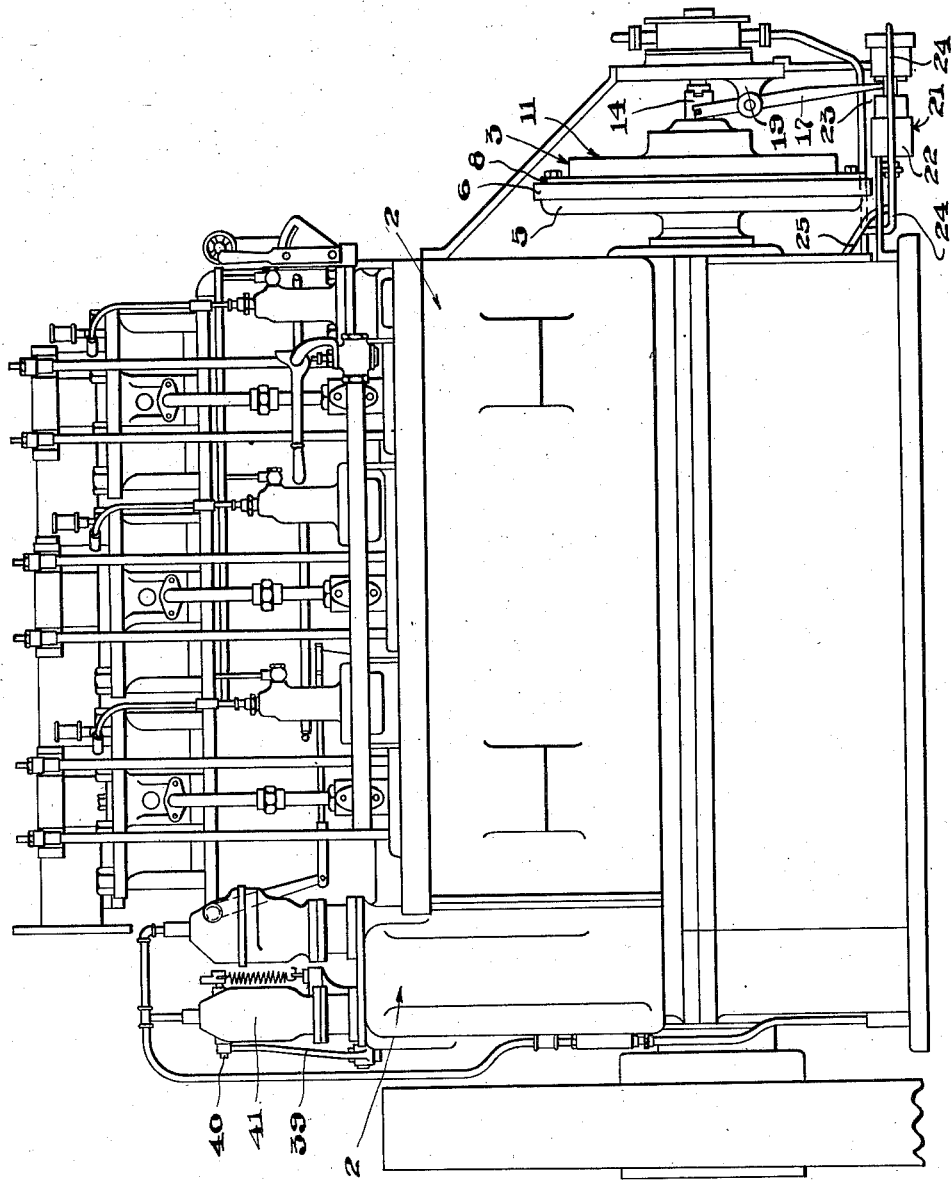
W. J. BLESSING
INVENTOR
BY
ATTORNEY

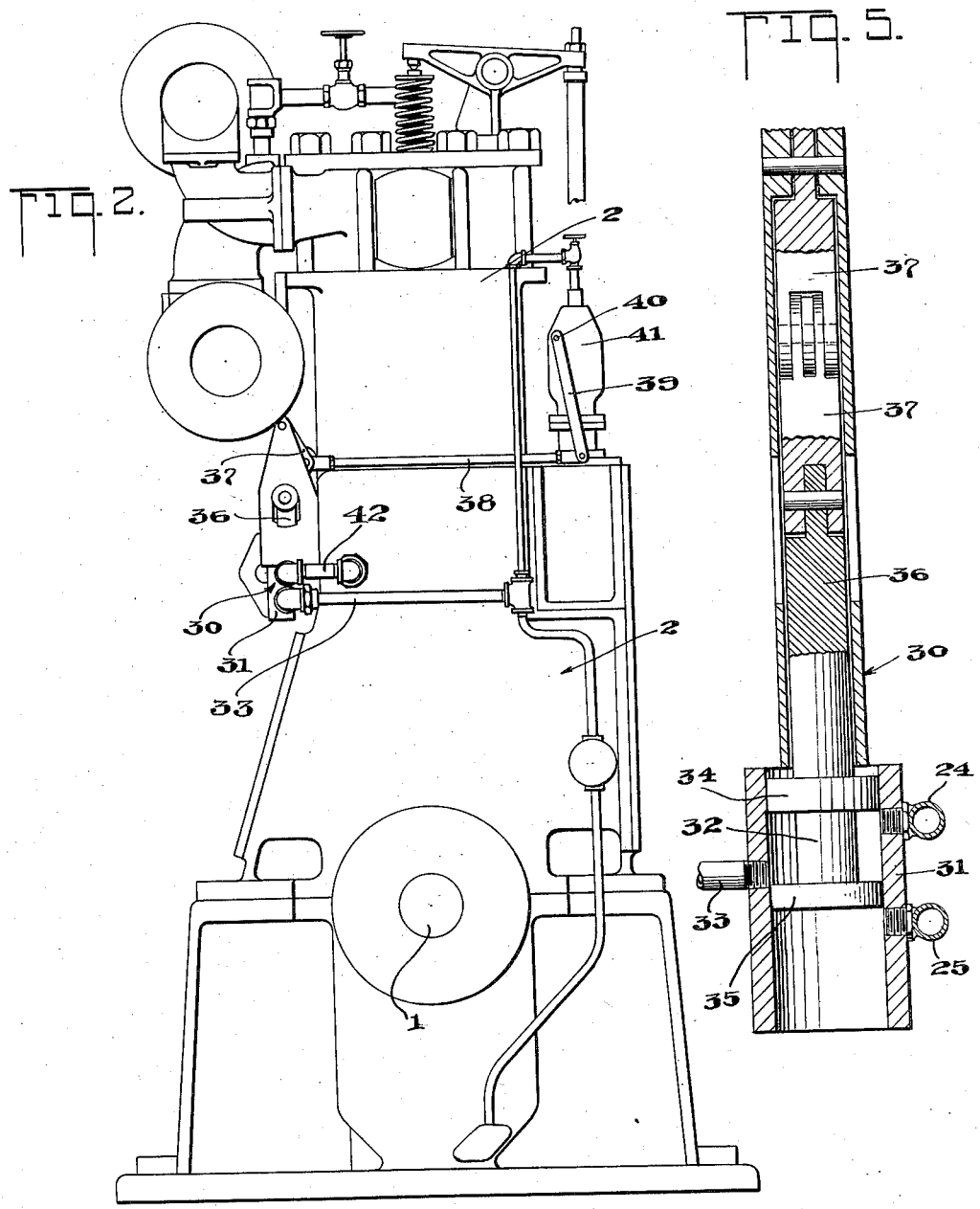

Aug. 25, 1936.  W. J. BLESSING  2,052,162
CRITICAL SPEED CONTROL APPARATUS
Filed April 7, 1934   4 Sheets-Sheet 3
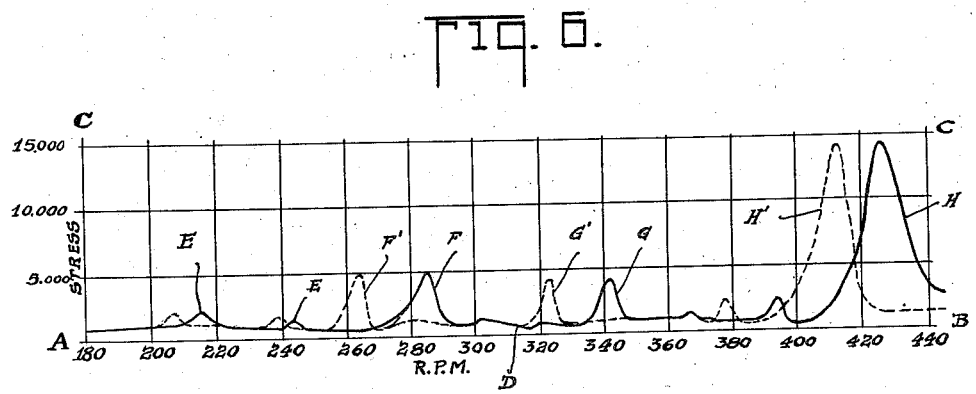
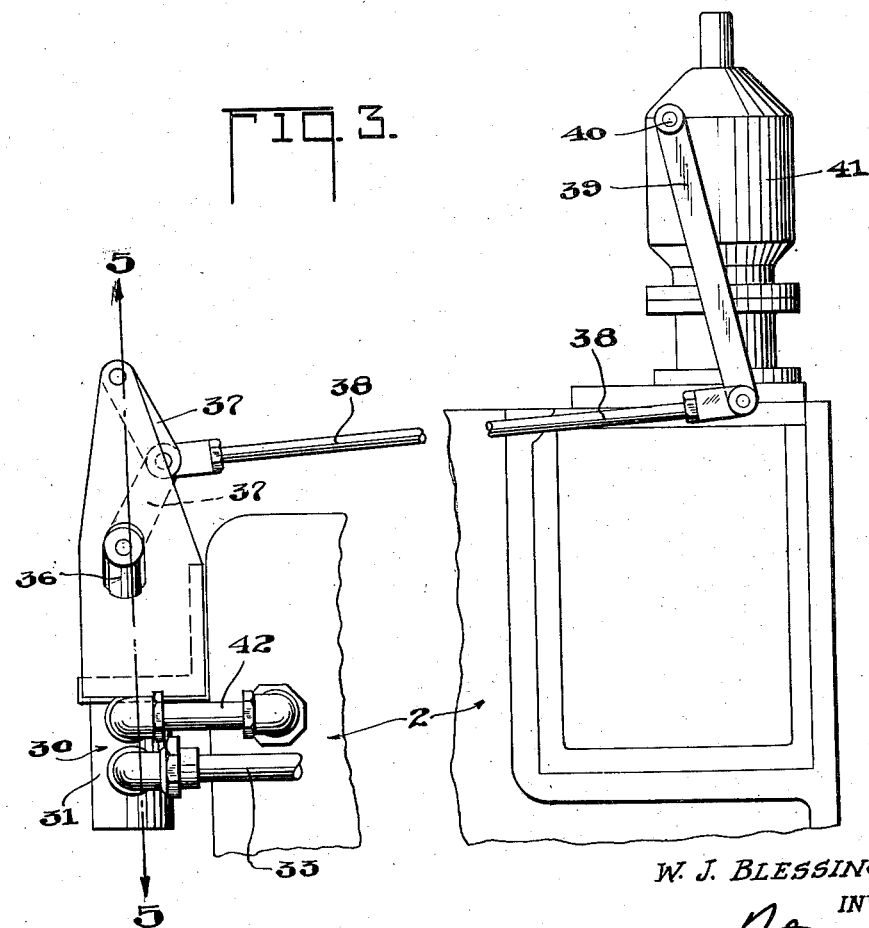
W. J. BLESSING
INVENTOR
BY
ATTORNEY Aug. 25, 1936.  W. J. BLESSING  2,052,162
CRITICAL SPEED CONTROL APPARATUS
Filed April 7, 1934  4 Sheets-Sheet 4

W. J. BLESSING
INVENTOR
BY
ATTORNEY

Patented Aug. 25, 1936

2,052,162

UNITED STATES PATENT OFFICE 2,052,162

CRITICAL SPEED CONTROL APPARATUS

William J. Blessing, Buffalo, N. Y., assignor to Worthington Pump and Machinery Corporation, New York, N. Y., a corporation of Virginia Application April 7, 1934, Serial No. 719,612

4 Claims. (Cl. 74—574)

This invention relates to power plants and more particularly to internal combustion engines, steam engines, compressors and the like.

An object of the invention is to provide means associated with the crank shaft of an engine or compressor for changing the moment of inertia of the crank shaft around its axis of rotation whenever the speed of the engine approaches a so-called critical speed with respect to the natural period of torsional vibration of the engine shaft and its associated rotating parts.

It is a well known fact that the shaft of an engine has a natural period of torsional vibration which, if the shaft is relatively long, may fall within the operating speed of the engine. When such a condition obtains, torsional vibrations in the shaft are set up and may reach such a magnitude as to set up stresses in it great enough to bring about failure of the shaft. Critical speeds corresponding to natural periods of vibration higher than the first order may bring about similar results but in any case may affect the smooth operation of the engine and are objectionable.

It is usual practice to so design the shaft and associated rotating parts of an engine that no critical speed with respect to torsional vibration coincides with or approaches the rated speed of the engine. In some cases, however, where an engine must operate at more than one speed, it is difficult or expensive to bring about the desired result and also in many cases it has been necessary to permit the engine to pass through a critical speed when the engine is started and while it is approaching its normal rated speed.

It is an object of the present invention to provide a mechanism which may be attached to the crank shaft of the engine and controlled by the speed of operation of the engine so that as the engine approaches any critical speed of an order low enough to over-stress the shaft or to impair the smoothness of operation of the engine, it will automatically change the moment of inertia of the crank shaft and its associated rotating parts and thereby so change the natural period of torsional vibration as to permit continuous operation as the speed of the engine is increased.

With these and other objects in view, as may appear from the accompanying specification, the invention consists of various features of construction and combination of parts, which will be first described in connection with the accompanying drawings, showing a critical speed control apparatus for rotary shafts, of the preferred form embodying the invention, and the features forming the invention will be specifically pointed out in the claims.

In the drawings:

Fig. 1 is a side elevation of an internal combustion engine of any approved type, showing the mechanism for controlling the critical speed thereof applied thereto.

Fig. 2 is an end elevation of an internal combustion engine, of the Diesel type showing the invention applied thereto.

Fig. 3 is an enlarged fragmentary view of a part of the mechanism for controlling the critical speed of the engine, showing some parts in side elevation and with certain other parts broken away.

Fig. 5 is a detailed section through a distributing valve which is employed in the critical speed controlling mechanism, and Fig. 6 is a curve, chart or diagram illustrating the application of the present invention.

Figure 4:
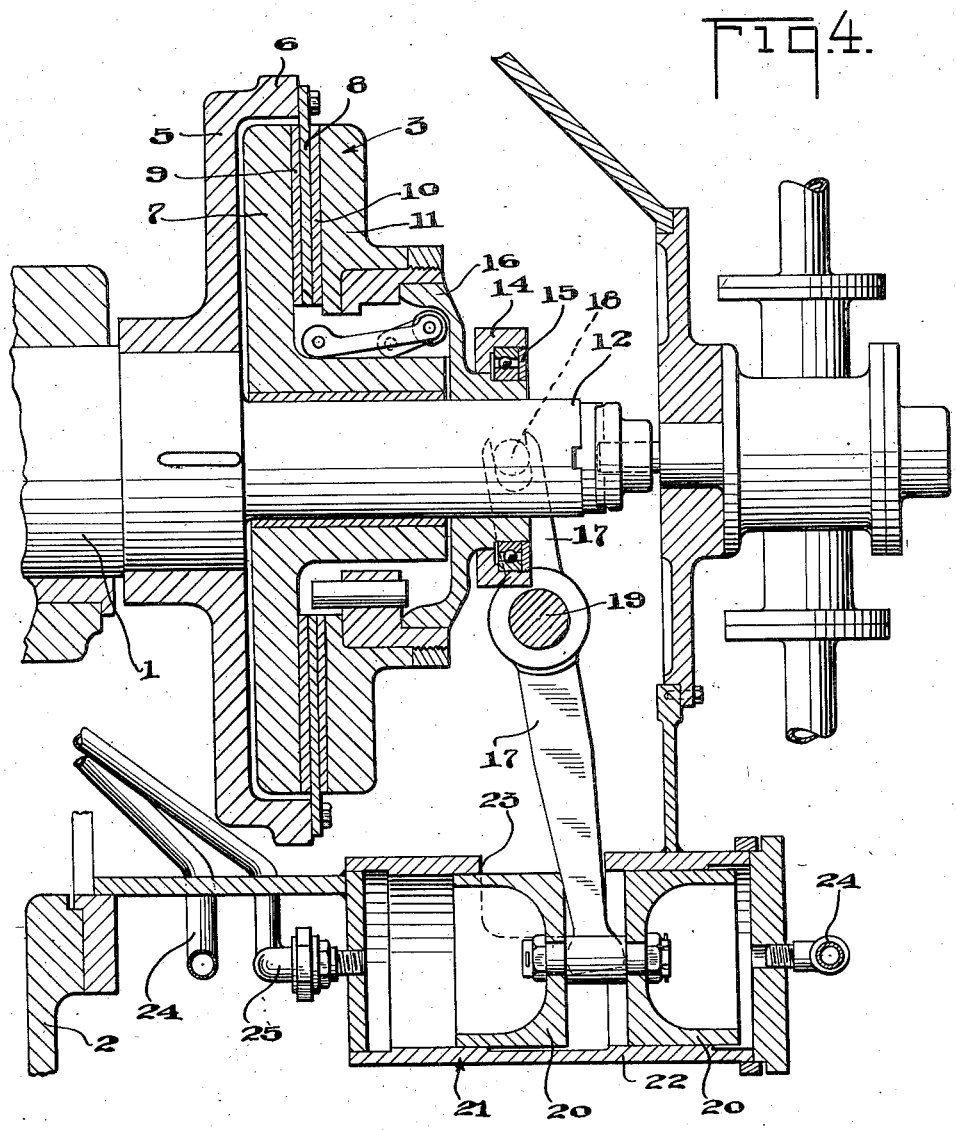
Fig. 4 is a section through a part of the critical speed controlling mechanism.

Referring more particularly to the drawings, and first to Fig. 6 of the drawings which shows a diagram or curve for explaining the application of the present invention. In this diagram the revolutions per minute of rotation of the crank shaft of an engine are represented by distance in the direction of the line AB while the stress set up in the crank shaft because of the torsional vibration is represented by the curved lines in the direction of lines AC.

The curve or line D represents the stress in the crank shaft of an engine of approved design, designed to meet certain specific conditions of operation, and it will be noted, by following this line D that when the crank shaft and associated rotating parts are rotating at speeds of from 180 revolutions per minute to approximately 280 revolutions per minute there is very little stress set up because of torsional vibrations, such stress or torsional strain being represented by the "humps" or raised points E in the line D. However, when the crank shaft reaches a speed of 280 revolutions per minute and from thereto substantially 290 revolutions per minute, the crank shaft is passing through one of the minor periods of torsional vibration, such minor periods of vibration being indicated by the raising of the line D as indicated at F. After the engine passes the 290 R. P. M. speed, it is relatively free from torsional vibration stresses or its critical speed until it approaches 340 R. P. M. where it passes through a second minor phase of torsional vibration or critical speed as indicated by the rise G.

However, as the engine reaches a speed of 400 R. P. M. it is approaching its maximum moment or period of torsional vibration stresses which period begins at substantially 410 R. P. M. and reaches its maximum at approximately 425 R. P. M., gradually decreasing from 425 R. P. M. until it again assumes normal operation. The diagram or curve shown in Fig. 6, represents the curve of operation of an internal combustion engine of the Diesel or oil burning type which is designed for a maximum speed of approximately 440 R. P. M. and one which is designed to perform best at speeds of 200 to 270 R. P. M. and from 300 to 400 R. P. M. However, it is to be understood that the present invention is applicable to any approved type of engine or compressor without departing from the spirit of the present invention. As the critical speeds, as indicated in the curve in Fig. 6 of the drawings by the rises F, G and H in the line D, are approached, the period of some one of the components of the torque curve approaches the natural period of torsional vibration of the crank shaft, and as the speed of the engine increases the period of this particular component coincides with the natural period of torsional vibration, and then passes beyond it. As the speed of the engine still further increases the period of the next lower component of the torque curve passes through the same phase relationship with the natural period of torsional vibration of the crank shaft. When these points and particularly the speed of, say, 420 to 425 R. P. M. are reached, rapid and violent torsional vibration of the crank shaft occurs until the limit of the range of speed corresponding to the natural period of vibration is passed. If, as the speed at which the period of one of the torque components approaches the natural period of torsional vibration, the moment of inertia of the crank shaft is changed, its natural frequency is also changed and the speed of the rotation of the crank shaft may pass through the ranges of speed indicated by the rises F, G and H in the line D without entering into the natural period of torsional vibration of the crank shaft. The objectionable vibration of the crank shaft may thus be prevented and the strain on the engine and its supports considerably lessened. After the speed of rotation of the crank shaft has passed through any one of the ranges indicated by the rises F, G and H in line D, the moment of inertia of the crank shaft is restored to its original value, and the speed of rotation of the crank shaft may be increased further without entering into the natural period of vibration of the crank shaft, until it reaches one of the other periods as indicated by the respective rises in line D. It is to be understood that a momentary coincidence of the period of a torque component with the natural period of torsional vibration of the shaft may occur at the instant when the moment of inertia is being changed but this coincidence being of extremely short duration will not appreciably increase the stress in the shaft.

In Fig. 6 of the drawings, dotted line rises F', G' and H' are shown to indicate the manner in which the change of the moment of inertia of the crank shaft steps back periods of natural torsional vibration, and the present invention comprises the mechanism which is controlled by the speed of operation of the crank shaft which mechanism will as the speed of the rotation of the crank shaft approaches the critical speeds indicated by the rises F, G and H, come into action and set back these periods so as to permit the engine to increase its speed through these critical periods without being subjected to the stresses set up by the torsional vibration.

The mechanism for changing the moment of inertia of the crank shaft 1 of the internal combustion engine 2 comprises an auxiliary fly-wheel structure 3 clearly illustrated in Fig. 4 of the drawings.

The fly-wheel structure 3 includes a rim 5 which is keyed or otherwise suitably fastened to the crank shaft 1 and has a flange 6 which overhangs the collared disc 7 of the clutch structure of the fly-wheel structure 3. The flange 6 has a clutch disc 8 attached thereto which engages a clutch ring or disc 9 carried by the disc 7 and has a second clutch ring 10 carried by the disc element 11 of the auxiliary fly-wheel structure 3. The ring 10 is movable longitudinally along the reduced end 12 of the crank shaft 1 and is moved by movement of the collar 14. The collar 14 does not rotate with the crank shaft 12 and a roller bearing 15 of any approved type is provided for reducing friction between collar 14 and its companion part 16 of the clutch mechanism.

A forked arm or lever 17 is connected to the collar 15 by means of pin 18, shown in dotted lines in Fig. 4 of the drawings. The forked lever 17 is pivotally supported by a suitable support 19 and its lower end is connected to the piston 20 of the pressure operated operating structure 21. In Fig. 4 of the drawings a particular construction of clutch is illustrated for clutching the discs or members 5, 7 and 11 together to form the auxiliary fly-wheel, but it is to be understood that any suitable type of clutch mechanism may be employed for this purpose without departing from the spirit of the invention.

The piston 20 reciprocates in the cylinder 22 of the pressure operated operating device 21 and as clearly shown in Fig. 4 of the drawings the cylinder 22 is cut away as shown at 23 to permit unimpeded movement of the lever 17. The piston 20 is reciprocated within the cylinder 22 by any suitable type of pressure fluid which may be derived from any suitable source. The fluid pressure is used as shown in Fig. 2 to actuate the piston 20.

The opposite ends of the cylinder 22, which are separated one from the other by the piston 20 have supply pipes 24 and 25 connected thereto, one to each end of the cylinder. The supply pipes 24 and 25 extend from their respective ends of the cylinder 22 to the distributor valve structure 30.

The distributor valve structure 30 controls distribution of the pressure fluid to the cylinder 22 and it includes a cylinder 31 which is open at both ends, and has a plunger or piston valve 32 mounted therein for reciprocation, to control the ports in the cylinder 31 which deliver the pressure fluid to the respective pipes 24 and 25 from the supply pipe 33. The supply pipe 33, may be connected to any suitable source of supply of pressure fluid. The plunger or piston valve structure 32 includes spaced pistons 34 and 35 so that when the plunger valve is moved and communication is established between the pipe 33 and the pipe 24, pressure fluid will flow through the distributor valve to the outboard or outlet end of the cylinder 22 to move the piston 20 inwardly from the position in which it is shown in Fig. 4 of the drawings. When the pressure fluid is admitted through the pipe 24, the lower end 35 of the plunger valve will be in such position, that the port which communicates with the pipe 25 will open through the lower open end of the cylinder 31 to atmosphere and permit any fluid under pressure which might be within the cylinder 22 behind the inner end of the piston 20 to bleed out through pipe 42 Fig. 2 to atmosphere and permit unobstructed movement of the piston 20 under the action of the pressure fluid which is admitted to the cylinder 22 through the pipe 24. When the plunger of the distributor valve 30 moves so that communication will be established between the supply pipe 33 and the pipe 25 pressure fluid is admitted into the cylinder 20 at the left hand end of the cylinder (referring to Fig. 4 of the drawings), and the upper head 34 of the piston or plunger valve 32 will be in such position that the port 25 will be open to the upper open end of the cylinder 31 to atmosphere and permit the pressure fluid to bleed from the right hand end of the cylinder 22.

The piston or plunger valve 32 has a stem 36 connected thereto which is in turn connected by a double link connection 37 to an operating rod 38. The operating rod 38 is in turn connected to a lever 39. The lever 39 is connected to the shaft 40 of the governor structure 41. The governor structure 41 may be of any approved type of governor structure, and is connected to the internal combustion engine 2 in such manner that it will be responsive to the speed of operation of the engine and will operate the rod 38 and stem 36 in proportion to the speed of rotation of the crank shaft 1 of the engine thereby providing means operated by and in unison with the speed of operation of the engine for operating the distributor valve 30 and controlling the supply of pressure fluid to the pressure operated mechanism 21. The delivery of pressure fluid to the mechanism 21 in turn operates the clutch structure to connect the auxiliary fly-wheel structure 3 to the crank shaft 1 at the proper moment of interval to change the moment of inertia of the crank shaft as the speed of rotation of the crank shaft approaches the natural period of vibration or critical speed, for the purpose of setting back the moment of inertia of the crank shaft to move back the torsional vibration period to points as indicated by the dotted line rises F', G' and H' in the diagram Fig. 6, thereby relieving the engine of these moments of torsional stress and permitting the engine to continue on through these normal points of critical speed without being subjected to the stresses set up by torsional vibration.

As the speed of rotation of the crank shaft approaches one of the periods of torsional vibration, the governor 41 will act through the lever 39, operating rod 38 and link 37, to move the plunger valve of the distributor valve structure 30 so as to admit the fluid under pressure through the pipe 25 to the cylinder 22 and at the same time open the end of the cylinder opposite to the one with which the pipe 25 communicates, to atmosphere through the distributor valve structure 30. The pressure fluid distributed to the cylinder 22 through the pipe 25 will force the piston 20 over into the position shown in Fig. 4 of the drawings. The movement of the piston 20 to the right (see Fig. 4 of the drawings) will operate the pivoted forked lever 17 and shift the collar 14 for shifting the clutch element into clutching position for connecting the members 7 and 10 to each other and bringing the clutch discs or rings 9, 8 and 10 to clutching engagement for connecting the entire auxiliary fly-wheel structure of the crank shaft 1 for changing the moment of inertia of the crank shaft.

After the speed of rotation of the crank shaft 1 has passed the particular critical speed, the governor 41 will then operate, to again move the plunger valve 32 of the distributor valve structure 35 to open the pipe 25 to atmosphere through the lower open end of the cylinder 31 and to admit pressure fluid to the end of the cylinder through the pipe 24 which will reverse the movement of the piston 20 and disconnect the clutch parts for disconnecting the auxiliary fly-wheel 3 from the crank shaft 1 and will consequently permit the engine to continue its operation in its normal manner.

It will be understood that the invention is not to be limited to the specific construction or arrangement of parts shown but that they may be widely modified within the invention defined by the claims.

What is claimed is:

1. The combination with an internal combustion engine having a rotatable shaft, of means brought into action when the speed of rotation of said shaft approaches a value corresponding to a period of torsional vibration for changing the moment of inertia of said shaft, said means including a flywheel normally loose on said shaft, a clutch for connecting said flywheel to said shaft, a governor lever operated by said engine and controlling operation of said clutch, and means including a toggle joint connected to said governor lever whereby when said governor lever is moved a predetermined distance said clutch will be operated to operatively connect said flywheel and shaft and upon further movement of the lever in the same direction said clutch will be operated in a reverse direction to disengage said flywheel and shaft.

2. The combination with an internal combustion engine having a rotatable shaft, of means brought into action when the speed of rotation of said shaft approaches a value corresponding to a period of torsional vibration for changing the moment of inertia of said shaft, a governor lever operated by said engine and controlling operation of said means, and means including a toggle joint connected to said governor lever for controlling operation of said means whereby when said governor lever is moved a predetermined distance said means will be brought into operative connection with said shaft and upon further movement of the lever in the same direction said means will be brought into inoperative connection with said shaft.

3. The combination with an internal combustion engine having a rotatable shaft, of means brought into action when the speed of rotation of said shaft approaches a value corresponding to a period of torsional vibration for changing the moment of inertia of said shaft, said means including a flywheel normally loose on said shaft, a clutch for connecting said flywheel to said shaft, a governor lever operated by said engine, pressure operated means for operating said clutch, a distributing valve controlling operation of said pressure operated means, and a toggle joint connected to said governor lever and to said valve whereby when said governor lever is moved a predetermined distance said valve will be operated to admit pressure fluid to said pressure means for operatively connecting said flywheel and shaft and upon further movement of the lever in the same direction said valve will be operated in a reverse direction to admit pressure fluid to said pressure operated means to operate said clutch for disengaging said flywheel and shaft.

4. The combination with an internal combustion engine having a rotatable shaft, of means brought into action when the speed of rotation of said shaft approaches a value corresponding to a period of torsional vibration for changing the moment of inertia of said shaft, pressure operated means for bringing said first named means into action, a governor lever operated by said engine, and means including a toggle joint connected to and operated by said governor lever for controlling operation of said pressure operated means whereby when said governor lever is moved a predetermined distance said pressure operated means will be operated to bring said first named means into action and upon further movement of the lever in the same direction said pressure operated means will be operated for taking said first named means out of action.

WILLIAM J. BLESSING.